UNITED STATES PATENT OFFICE.

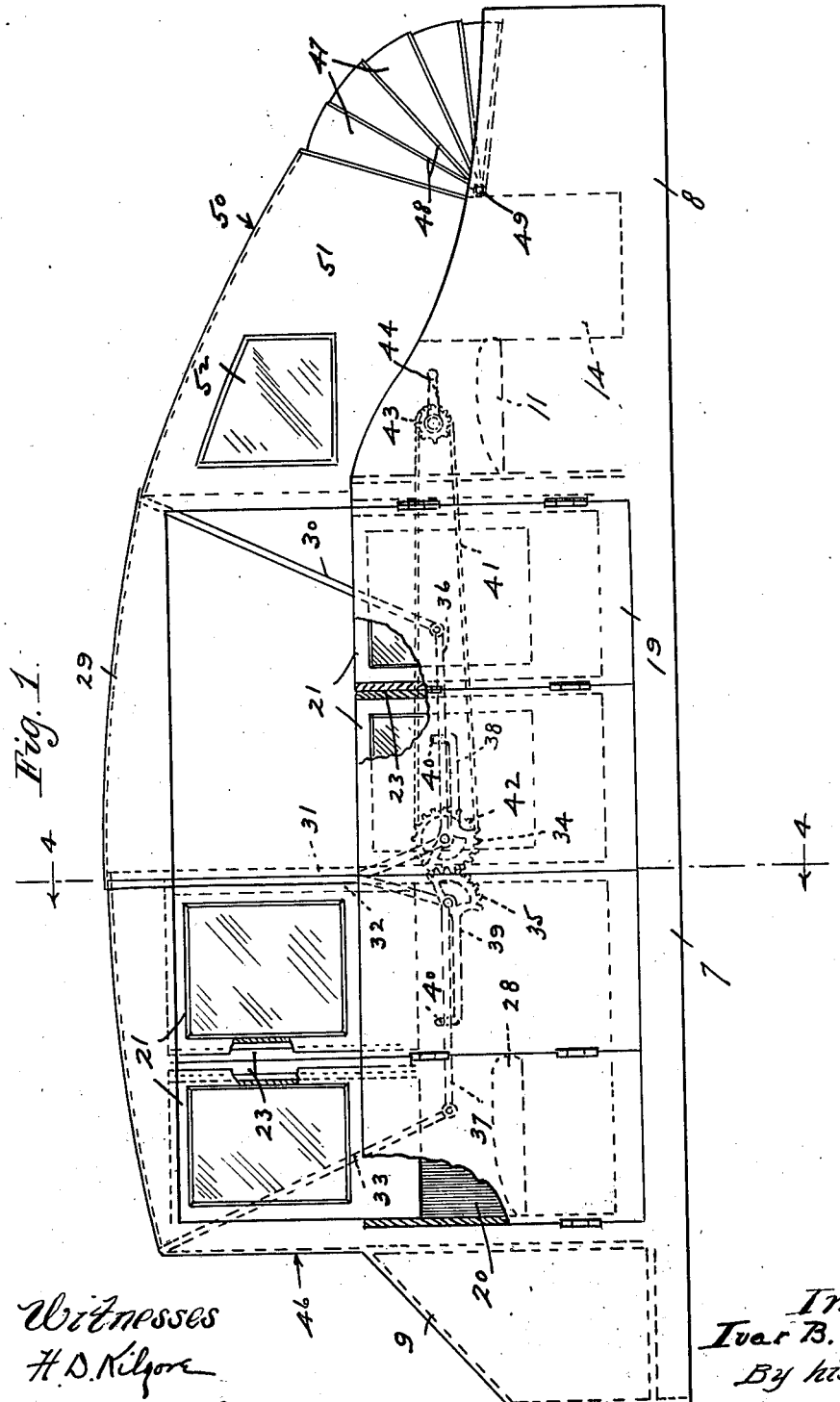

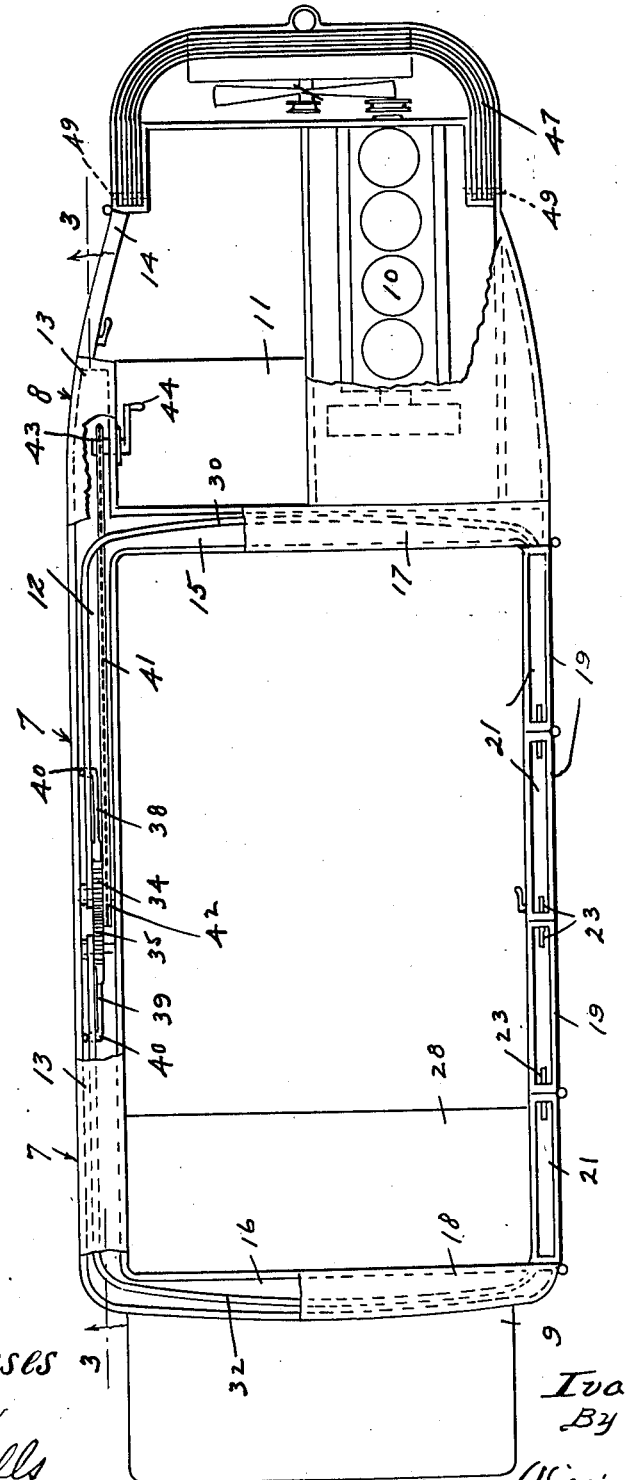

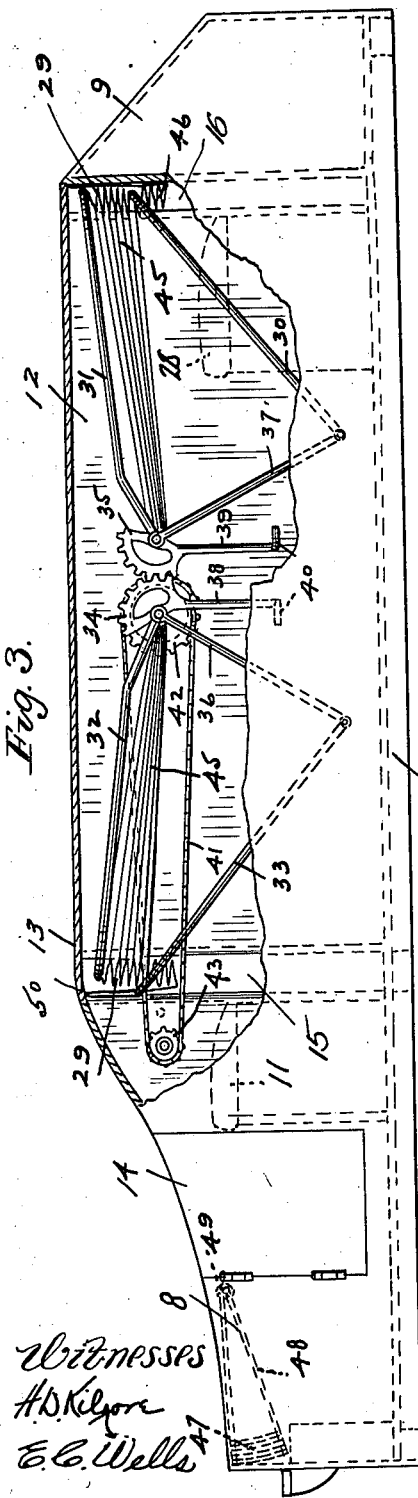

IVAR B. ANDERSON, OF DARWIN, MINNESOTA.

VEHICLE BODY AND TOP.

1,292,220.　　　　Specification of Letters Patent.　　Patented Jan. 21, 1919.

Application filed July 5, 1918.　Serial No. 243,377.

*To all whom it may concern:*

Be it known that I, IVAR B. ANDERSON, a subject of the King of Sweden, residing at Darwin, in the county of Meeker and State of Minnesota, have invented certain new and useful improvements in Vehicle Bodies and Tops; and I do hereby declare the following to be a full, clear, and exact description of the invention, such as will enable others skilled in the art to which it appertains to make and use the same.

My invention relates to vehicle bodies and tops and has for one of its objects to provide a top supported entirely from one side of the body during its raising and lowering movement, whereby the other side of the top and body may be left open. A further object is to provide a compartment in the body into which the top may be folded. A still further object of the invention is to provide mechanism within the compartment for raising and lowering the top.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a right side elevation of the invention with some parts broken away and some parts sectioned;

Fig. 2 is a plan view of the same with the top down and some parts broken away and some parts sectioned;

Fig. 3 is a view, partly in left side elevation and partly in longitudinal vertical section, taken on the line 3—3 of Fig. 2; and Fig. 4 is a transverse vertical section taken on the line 4—4 of Fig. 1.

The numeral 7 indicates the main body of a motor-driven vehicle provided with a front extension 8 and a rear extension 9, which affords a storage compartment.

Mounted in the front body extension 8, on a suitable base at the right-hand side thereof, is an internal combustion engine 10, which affords the motive power for the vehicle. Also built into the front body extension 8, at the left-hand side thereof, is a driver's seat 11. The entire left side of the main body 7 is closed and formed in the wall thereof is a narrow compartment 12, which is open at its top and extends the full length of said main body and part way into the front extension 9. A section cover 13 is provided for the compartment 12 and the member thereof, at the side of the main body 7, is hinged to the outer wall of said body and, when open, forms a vertical extension thereof. Access may be had to the front body extension 8 through a door 14 in the left-hand side thereof. Formed in the front and rear walls of the main body 7, are compartments 15 and 16, respectively, which open into the compartment 12, and are also open at their tops. Covers 17 and 18, respectively, are provided for the compartments 15 and 16.

The entire right-hand side of the main body 7 is closed by doors 19. As shown, there are four of these doors 19, the outer two being hinged to the ends of the main body 7, and the other two are hinged to said outer door. Ordinarily, only one or both of the intermediate doors 19 will be used, but when all four doors are open, the main body 7 will be open from end to end. Suitable latches, not shown, will be provided for the door 19. In each door 19, is formed, from the top down, a pocket 20 in which is mounted, for vertical sliding movement, a window 21 for use in connection with a top and curtains of novel construction. Locking devices 22 are provided for holding the windows 21 raised. To form tight joints between the adjacent windows 21, when raised, joint strips 23 are mounted in channels formed in the stiles thereof.

While only a single seat 28 is shown in the main body 7, a second seat of course may be provided.

The top 29, which is made from fabric or other pliable material, is transversely divided to form front and rear sections. Said front top section is attached to a front bow 30 and an intermediate bow 31, and the said rear top section is attached to an intermediate bow 32 and a rear bow 33. The right-hand legs of the bows are very short and, when the top 29 is raised, are supported from the windows 21. The left-hand legs of all of the bows extend into the compartment 12 and the two left-hand legs of the intermediate bows 31 and 32 are rigidly secured to a pair of intermeshing segmental gears 34 and 35, respectively. These gears 34 and 35 have short shafts journaled in the side walls of the body 7. A link 36 pivotally connects the left-hand leg of the front bow 30 and the shaft of the gear 34, and a link 37 pivotally connects the corresponding leg of the rear bow 33 to the shaft of the gear 35.

Integrally formed with the gears 34 and 35, are substantially radially projecting arms 38 and 39, respectively, having, at their free ends, hooks 40 arranged to be carried into and out of engagement with the links 36 and 37. The top sections are simultaneously raised and lowered by a sprocket chain 41 arranged to run over a relatively large sprocket wheel 42, keyed to the shaft of the gear 34 and a relatively small sprocket wheel 43 journaled in the compartment opposite the driver's seat 11. The shaft for the sprocket wheel 43 extends into the body extension 8 and is provided with a hand crank 44 by which the driver may raise or lower the top sections. When the top sections are lowered, the front section is folded entirely within the compartments 12 and 15 and the rear section is folded entirely within the compartments 12 and 16. In this position of the top sections, the same are entirely out of sight when the compartments in which they are folded are closed by their covers. Also when the top sections are folded, the arms 38 and 39 are out of engagement with the links 36 and 37.

To raise the top sections, the crank 44 is operated and the gears 34 and 35 moved thereby first lift the intermediate bows 31 and 32. This movement of the gears 34 and 35 carries the hooks 40 of the arms 38 and 39 into engagement with the links 36 and 37 and a further movement of said gears will cause the arms 38 and 39 to lift the front bow 30 and rear bow 33 through the links 36 and 37, respectively. The purpose of causing the arms 38 and 39 to move away from the links 36 and 37 is to permit the intermediate bows to fold toward the front and rear bows.

When the top sections are raised, suitable means, not shown, will be provided for holding the intermediate bows against folding movement and the front and rear bows are held by the links 36 and 37, which, in turn, are supported by the respective arms 38 and 39. Left-hand side curtains 45 are attached to the top sections for folding movement therewith into the respective compartments and a rear curtain 46 is also attached to the rear top section for folding movement therewith. A wind shield 47 is mounted at the front end of the body extension 8 and comprises a plurality of transparent sections of celluloid or other suitable material secured to a plurality of folding bows 48 having their ends secured to a pair of alined pivots 49 attached to the side of said body extension. As shown in Fig. 3, the wind shield 47 may be folded into the front body extension 8 below the upper edge thereof.

A supplemental top 50, having side curtains 51 attached thereto, is provided for the front body extension 8. This top 50 is attached to the front bow 30 and forms a forward extension of the main top 29. The front end of the supplemental top 50 is detachably secured to the uppermost bow 48 of the wind shield 47 by separable fasteners, not shown, and, in turn, holds said wind shield raised. When the main top 29 is lowered, the supplemental top 50 is detached from the wind shield 47 and folded, together with the curtains 51, with the front section of said main top. Suitable separable fasteners, not shown, will be provided for holding the curtains 45—46 and 51 drawn. All joints between the top section, curtain and windows will have water-proof joints. By reference to Fig. 4, it will be noted that the lower edges of the curtains 45 overlap the upturned cover 13, so as to shed water. The curtains are also provided with windows 52 of celluloid or other suitable material.

From the above description, it is evident that the main and supplemental tops may be raised and lowered with very little work and, when raised, together with the curtains and wind shield, completely inclose the body 7 and its front extension.

What I claim is:

1. The combination with a vehicle body, of a top for said body, a main bow and a supplemental bow supporting said top, said main bow having one of its legs pivoted to said body, a link pivotally connecting the corresponding leg of the supplemental bow to said body, and means for raising and lowering the main bow.

2. The combination with a vehicle body, of a top for said body, a main bow and a supplemental bow supporting said top, said main bow having one of its legs pivoted to said body, a link pivotally connecting the corresponding leg of the supplemental bow to said body, and means for raising and lowering the main bow including means for raising and supporting the link.

3. The combination with a vehicle body, of a top for said body, a main bow and a supplemental bow supporting said top, a gear journaled on said body, said main bow having one of its legs rigidly secured to said gear, a link pivotally connecting the corresponding leg of the supplemental bow to said body at the axis of the gear, and connections for oscillating said gear to raise and lower the top.

4. The combination with a vehicle body, of a top for said body, a main bow and a supplemental bow supporting said top, a gear journaled on said body, said main bow having one of its legs rigidly secured to said gear, a link pivotally connecting the corresponding leg of the supplemental bow to said body at the axis of the gear, an arm carried by said gear and arranged to pick up said link and support the same when the top is raised, and connections for oscillating said gear to raise and lower the top.

5. The combination with a vehicle body, of a transversely divided top for said body, a main bow and a supplemental bow supporting each section of said top, intermeshing gears journaled on said body, the legs of the main bow at one side of said body being rigidly secured, one to each of the gears, a link connecting corresponding legs of the supplemental bows to said body at the axes of the respective gears, arms carried by the gears and arranged to pick up the respective links and support the same when the top is raised, and connections for oscillating the gears to raise and lower the top.

6. The combination with a vehicle body, of a transversely divided top for said body, a main bow and a supplemental bow supporting each section of said top, intermeshing gears journaled on said body, the legs of the main bow at one side of said body being rigidly secured, one to each of the gears, a link connecting corresponding legs of the supplemental bows to said body at the axes of the respective gears, arms carried by the gears and arranged to pick up the respective links and support the same when the top is raised, connections for oscillating the gears to raise and lower the top, and compartments in the walls of said body to receive and hold the folded top section.

7. The combination with a vehicle body having a compartment extending from one side thereof into one end thereof, of a top section adapted to be folded into said compartment, said top section during its raising and lowering movement being supported entirely from the side of the body in which said compartment is formed.

8. The combination with a vehicle body having a compartment extending from one side thereof into one end thereof, of a top section adapted to be folded into said compartment, said top section during its raising and lowering movement being supported entirely from the side of the body in which said compartment is formed, and mechanism in said compartment for raising and lowering the top section.

9. The combination with a vehicle body having a compartment extending through one of its sides into both ends thereof, of a transversely divided top arranged to be folded into said compartment, said top during its raising and lowering movement being supported entirely from the side of the body in which said compartment is formed.

10. The combination with a vehicle body having a compartment extending through one of its sides into both ends thereof, of a transversely divided top arranged to be folded into said compartment, said top during its raising and lowering movement being supported entirely from the side of the body in which said compartment is formed, and means on the other side of the vehicle for supporting the top in part when raised.

11. The combination with a vehicle body having a compartment extending through one of its sides into both ends thereof, of a transversely divided top arranged to be folded into said compartment, said top during its raising and lowering movement being supported entirely from the side of the body in which said compartment is formed, and means including vertically adjustable windows on the other side of the vehicle for supporting the top in part when raised.

In testimony whereof I affix my signature in presence of two witnesses.

IVAR B. ANDERSON.

Witnesses:
P. RODOUGE,
D. N. THORALSEN.